United States Patent [19]

Wagoner

[11] 4,103,429

[45] Aug. 1, 1978

[54] SUN AND STAR TIME DIAL

[75] Inventor: James E. Wagoner, Swanton, Ohio

[73] Assignee: Toledo Astronomical Association, Toledo, Ohio

[21] Appl. No.: 826,729

[22] Filed: Aug. 22, 1977

Related U.S. Application Data

[63] Continuation-in-part of Ser. No. 770,521, Feb. 22, 1977.

[51] Int. Cl.² ...................... G01C 17/34; G01C 21/02; G04B 49/00

[52] U.S. Cl. ...................................................... 33/270

[58] Field of Search .................. D10/45; 33/269, 270, 33/271

[56] References Cited

U.S. PATENT DOCUMENTS

| | | | |
|---|---|---|---|
| 205,485 | 7/1878 | Holmes | 33/270 |
| 2,567,139 | 9/1951 | Wenz | 33/269 |
| 2,582,179 | 1/1952 | Thomson | 33/270 |
| 3,815,249 | 6/1974 | Gundlach | 33/269 |

FOREIGN PATENT DOCUMENTS

| | | | |
|---|---|---|---|
| 214,034 | 4/1924 | United Kingdom | 33/271 |

*Primary Examiner*—Steven L. Stephan
*Attorney, Agent, or Firm*—Hugh Adam Kirk

[57] ABSTRACT

A combination nocturnal and sundial celestial timepiece comprising a horizontal base marked with the cardinal points of the compass with a central post having an east-west adjustable pivot at the center of a vertical protractor or latitude scale depending in a vertical plane with spaced oppositely extending legs with aligned apertures for setting the protractor at the latitude of the observer so that the apertures align with the polestar, when the protractor is in the vertical north-south plane. Mounted around and pivoted on a hollow sleeve through the aperture at the upper end of the protractor are a circular date and time dial and a pointer; the outer periphery of which dial is calibrated in the days of the year and can be set for the date with the edge of the protractor and the inner peripheral dial is calibrated in the 24 hours of the day. Either this edge of the protractor or the adjacent end of the pointer may have an arc for compensating the exact longitude time with that of the time zone for indicating on the time dial the zone time of the day. The other end of the pointer diametrical of the dial extends beyond the periphery to provide a notch or aperture through which a pointer star of the Big Dipper may be sighted from the aperture at the lower end of the protractor, so that the pointer reads the time of the night on the time dial. This other end of the pointer also has a gnomon with an aperture therein and, spaced intermediate the ends of the pointer, a post with a central line for alignment of the pointer and the gnomon with the rays from the sun so that when sunlight from the sun shining through the gnomon's aperture falls on the line of the post, at which alignment the pointer will indicate the time of day.

12 Claims, 3 Drawing Figures

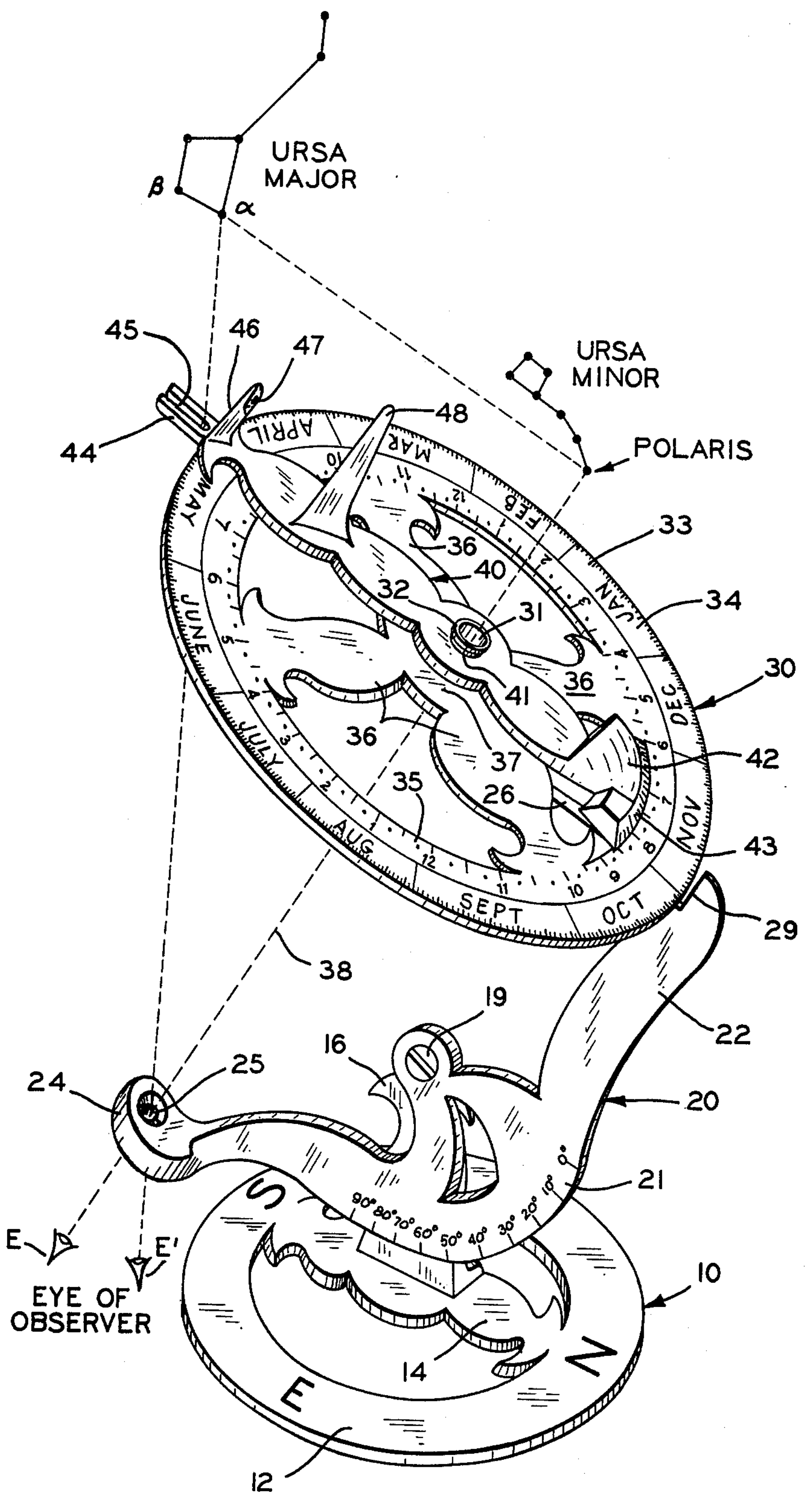
FIG. I

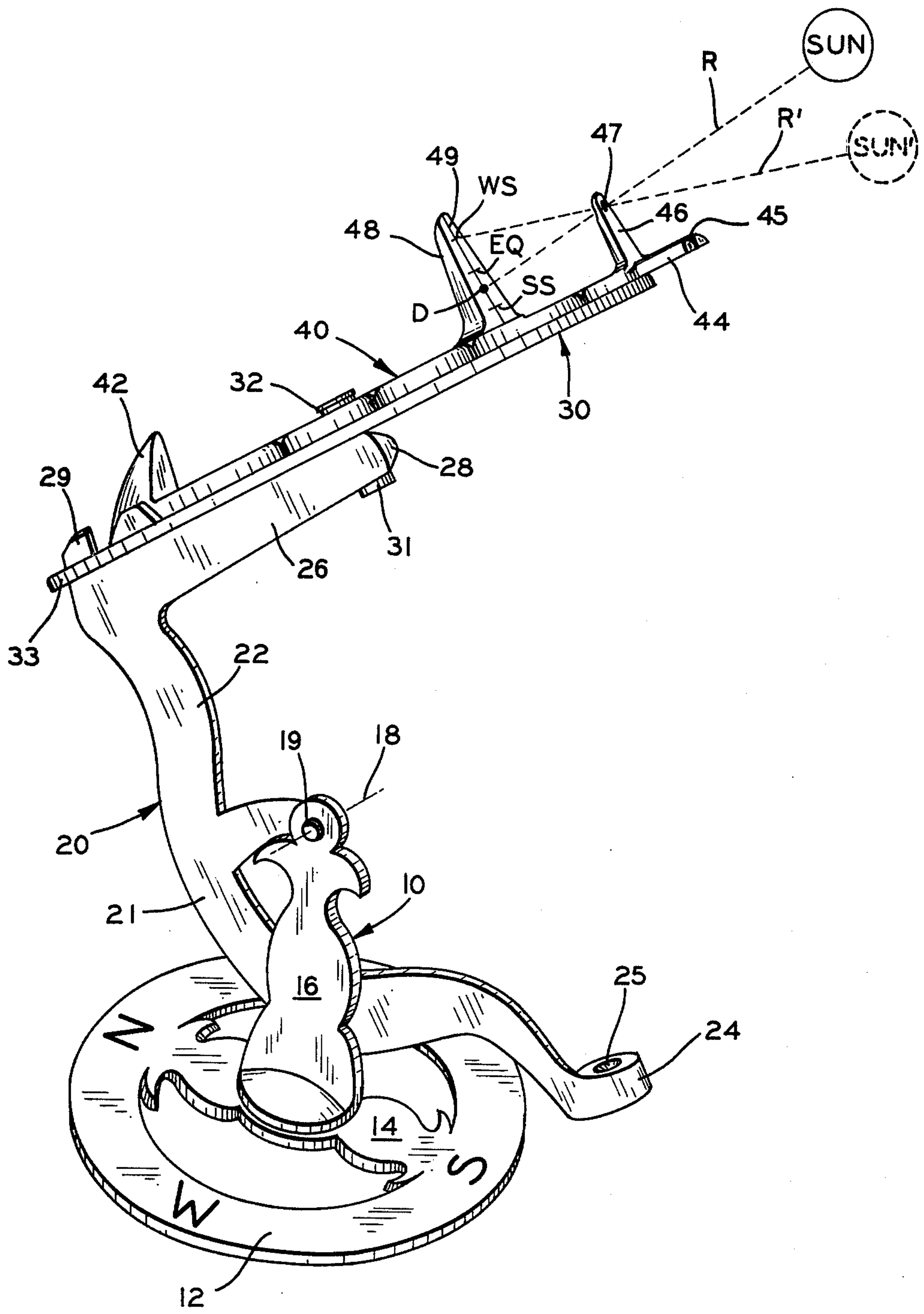
FIG. II

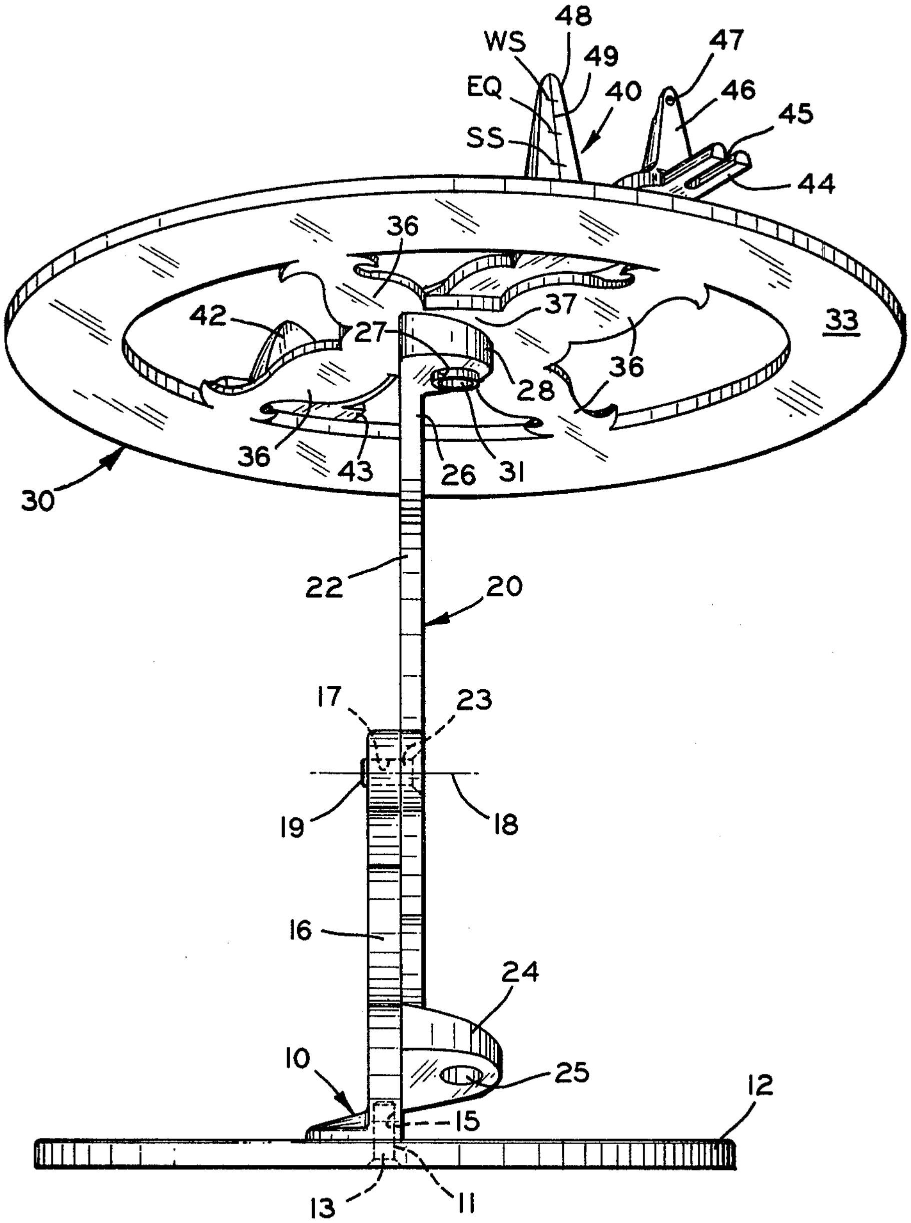
FIG. III

SUN AND STAR TIME DIAL

RELATED APPLICATION

This is a continuation-in-part of applicant's copending U.S. Design Application Ser. No. 770,521 filed Feb. 22, 1977.

BACKGROUND OF THE INVENTION

Although sundials and nocturnals have been used for telling time for centuries and even combination instruments have been built, such as disclosed in Thomson U.S. Pat. No. 2,582,179 issued Jan. 8, 1952, and Fleming U.S. Pat. No. 3,073,032 issued Jan. 15, 1963, these combination devices require separately concentrically relatively movable circular scales, as well as outside equipment for their setting or proper operation, such as a clock or a light source for their initial setting. Furthermore, they are relatively complicated and require several parts which must be accurately made and adjustable with precision.

SUMMARY OF THE INVENTION

Generally speaking, the sun and star dial of this invention comprises only four relatively movable parts, each of which may be die cast and no one of which requires accurate machining. The only machining necessary is for the two pivotal connections between the parts on the equitorial and axes, and preferably also the sighting hole and sunray hole.

These four essential parts comprise a base, a protractor means, a date and hour dial, and a gnomon pointer. The base supports the protractor means having spaced aligned sighting holes, the upper one of which hole also acts as a hollow tubular axis for mounting the date and time dial and the gnomon pointer concentrically of each other.

More specifically, the base herein may comprise two parts, one of which comprises a disc with a single north-south diametric spoke, the center of which spoke may be separately mounted an L-shaped or bottom flanged post with an east-west aperture at its upper end; the short leg of the L-shaped base being fastened such as by a screw to the center of the diameter spoke on the disc base.

The axis of the quadrant protractor of the protractor means is pivoted on the east-west horizontal axis at the upper end of the base post and may be clamped thereto by an axial screw or bolt and nut. The quadrant protractor may be divided into 90° of latitude and has extending outwardly from its ends two legs, at the extremities of which legs are aligned apertures. The lower aperture is a sighting aperture and the upper aperture is a socket for a hollow tubular bearing means. These legs of the protractor means form a sort of an L-shaped member in which the quadrant protractor is along the longer leg of the L, and the tubular bearing aperture is at the end of the shorter leg of the L, and an indicator mark for the date and hour dial at the apex or angle of the L.

Mounted around the hollow tubular bearing and coaxial therewith are the annular date and time dial or ring and the gnomon pointer. The date and time dial have a plurality of spokes and annular ring peripherially marked with the months and days of the year setting to the mark at the apex of the L-shaped protractor means, and inwardly of these day markings on the ring are concentrically marked the 24 hours of the day in two 12-hour successive intervals.

The gnomon pointer is substantially centrally pivoted on the hollow tubular bearing and is rotatable diametrically of and in a plane adjacent to for cooperation with the marked ring of the day and time dial. This gnomon pointer preferably has at its one or indicator end an arcuate scale to compensate for the difference between the actual continuously changing longitude time and the time of the observer's time zone, and reads directly the time from the inner peripheral time dial markings. At the opposite end of the diametrical gnomon pointer, which end extends beyond the periphery of the date and time dial, there is provided a radially extending fork or slit through which the sighting aperture at the lower end of the protractor means may be aligned with the pointer star, Alpha, of the star constellation Ursa Major or the Big Dipper. Adjacent this is provided a gnomon extending upwardly from the pointer parallel to its axis of rotation which gnomon has an aperture near its outer end, the axis of which aperture is parallel with the longitudinal axis of the pointer. Intermediate the tubular bearing and the gnomon there is an upwardly extending post parallel with the gnomon, which has a central line marked thereon in the plane of the longitudinal axis of the gnomon, which line may be graduated with a central equinox position and upper winter and lower summer solstice positions for indicating the seasons of the year by the point of sunlight that extends through the aperture in the gnomon when the gnomon and this line are aligned with the sun.

Before the time of day and night can be read directly from the sun and star dial of this invention, the base must be mounted in a horizontal plane with the axis on its post extending in the direct east-west directions and the protractor set with the vertical base post at the angle or degrees on the observer's latitude or so that the North Star can be sighted through the sighting aperture at the lower end of the protractor means and the center of the hollow bearing at its upper end. Now, the time of day can be read from the indicator end of the gnomon pointer with the "0" or 12-hour position is aligned with the apex angle mark on the protractor means and the pointer gnomon is directed so that the rays of the sun falling through the aperture of the gnomon fall on the vertical line of the post on the gnomon. The time of night can be read from the indicator end of the gnomon pointer when the day of the year is set at the apex of the protractor means and a pointer star of the Big Dipper is aligned with the slot in the outer end of the pointer when sighted through the sighting aperture at the lower end of the protractor means.

BRIEF DESCRIPTION OF THE VIEWS

The above mentioned and other features, objects and advantages, and a manner of attaining them are described more specifically below by reference to an embodiment of this invention shown in the accompanying drawings, wherein:

FIG. I is a front and side perspective view of a preferred embodiment of the sun and star timepiece of this invention, with the sightings to the stars shown in dotted lines for telling the time at night;

FIG. II is a perspective view of the other side of the timepiece shown in FIG. I showing in dotted lines how the time of day is determined by the rays from the sun; and FIG. III is a view of the device shown in FIGS. I and II looking in the direction of the vertical plane of the protractor means that supports the dial and pointer members.

DETAILED DESCRIPTION OF THE PREFERRED EMBODIMENT

A. The Base

Primarily, the base 10 is to support the protractor means 20, which in turn supports the date and time dial 30 and concentrically and diametrically thereof the gnomon pointer 40. Each of these four separate and relatively movable parts may be and herein are molded or cast, such as of plastic or metal, respectively, for example aluminum, and may be coated to prevent oxidation or deterioration, particularly if the timepiece is to be mounted permanently outside in the weather, such as a sundial in the garden.

In the present embodiment, the base 10 comprises an annulus or ring 12 around which may be marked the cardinal points of the compass: N-north, S-south, E-east, and W-west, and may have a central N-S diameter spoke 14. Through the axial center of the spoke 14 there may be provided a hole 11 (see FIG. III) for a screw 13 for attachment of a vertical L-shaped post 16 having at its lower end a thread hole 15 and at its upper end a horizontal threaded aperture 17 on the pivotal axis 18 for a clamping bolt and nut or screw 19 for supporting the protractor means 20 at the latitude angle of the observer or position of the timepiece. If desired, the base 10 comprising herein the ring 12, spoke 14 and post 16, may be made or cast of a single piece without departing from the scope of this invention. Furthermore, the design of the ring base 10 or its shape may be also changed provided it can support the axis 18 in an east-west direction for the vertical adjustment of the protractor means 20.

B. Protractor Means

The protractor means 20 is herein shown to be a type of inverted L-shaped piece with at least a 90° protractor arc or sector portion 21 along its longer leg section 22 with a pivot aperture 23 on the axis 18 at the axial center of the protractor 21, which aperture 23 seats the clamping bolt or screw 19. The outer and lower end of the longer leg 22 may be enlarged and/or offset to provide a transverse knob portion 24 for a sighting aperture 25 which may be conically counterbored from one or both ends to form a sharp sighting circular edge. The shorter leg 26 of the L-shaped protractor member 20 may also have an enlarged and/or offset outer knob portion 28 with an aperture 27 therein axially aligned along the axis 38 with the aperture 25 in the other and lower end of the longer leg 22 of the protractor member 20. The apex angle between the two leg portions 22 and 26 is shown herein to be provided with a marking projection or lip 29 as a setting indication point for the date and time dial 30.

C. Date and Time Dial

Mounted inside the aperture 27 in the outer end of the leg 26 of the protractor means 20 is a hollow cylindrical or tubular sleeve member 31 which acts as a bearing for the dial 30 and pointer 40 which are free to rotate around this sleeve. One end of this bearing sleeve may be flanged outwardly to form a rim 32, and the other end after assembly also may be flanged outwardly for locking it in place.

Concentrically around and extending radially along the shorter leg 26 of the protractor means 20, is rotatably mounted the date and time dial, wheel or disc 30 which may comprise a ring, rim or annular portion 30 with its outer peripheral surface 34 marked circumferentially at its periphery with the successive days and months of the year for setting the date at the fixed indicator projection 29. The inner annular peripheral surface 35 of the rim 33 is marked circumferentially with the 24 hours of the day divided into equal numbered 12-hour periods and fractions thereof. This rim 33 is shown herein to be provided with four orthogonally mounted spokes 36 extending from its central apertured hub portion 37 journalled on the tubular bearing 31 around the axis 38.

D. The Gnomon Pointer

Diametrically across the upper face of the dial 30 is centrally pivotally mounted the longitudinal gnomon pointer 40 which has near its center an aperture 41 by which it freely rotates on the hollow tubular bearing 31. At the indicating end 42 of the pointer 40 there may be provided an arcuate scale 43 which is calibrated in time to correspond with the radial fractional hour markings on the time dial 35 to compensate for the difference between the longitude time and that of the time zone in which the instrument of timepiece is located. This indicating end 42 is shown herein to have a bulky projection which is to counterbalance the weight of the gnomon 46 and post 48 mounted near the other end of this pointer 40.

The opposite end of the pointer 40 from that of the indicator 42 and/or scale 43 there is provided a radially projecting fork 44 having a central radially extending slot 45 therein, which fork 44 projects beyond the outer periphery of the rim 33 and its date dial 34. This notch 45 is for sighting alignment with the sighting aperture 25 at the lower end of protractor means 20 for determining the time at night from the stars. Adjacent this forked end 44 there projects upwardly and outwardly a gnomon 46 parallel to the axis 38 and having at its upper outer end an aperture 47 having an axis perpendicular or radial to the axis 38. In determining the time of day from the sun, light rays from the sun shine through the aperture 47 onto the post member 48 also mounted upwardly and outwardly on the pointer 40 parallel to the gnomon 46. This post 48 is about twice the height of the aperture 47 above the pointer 40 and is provided on its flat side perpendicular to the axis of the hole 47, and may have a longitudinal line 49 with cross markings WS, EQ and SS for alignment with the rays R and R′ of the sun (see FIG. II) that shine through the hole 47 onto the line 49. The cross markings on the line 49 can be used to indicate the seasons of the year, the upper most one WS corresponding to the winter solstice, the lower most one SS corresponding to the summer solstice, and the center cross marking EQ at the perpendicular to the axis 38 through the hole 47 corresponding to the two equinoxes, spring and autumn. The height of the post 48 with respect to the height of gnomon 46 depends upon their relative spacing along the longitudinal centerline of the pointer 40 and the latitude of the observer or timepiece. The greater the radial distance between the gnomon 46 and the post 48, the longer the gnomon 48 and the higher the aperture 47 must be.

E. Operation

Before the timepiece of this invention can be used, it first must be properly mounted or located, that is the base 10 must be set on a horizontal plane so that the axis 18 extends directly east and west and the plane of the protractor means 20 is in the north-south direction. If desired, the base 10 and particularly the portions 12 and 14 thereof, may be permanently mounted on a post or other standard in the garden or out-of-doors. This may be done by drilling holes in the base 10 or cementing it in place, as desired. Next, the protractor means 20 is set around the axis 18 so that the sighting line along the axis 38 from the eye at location E in FIG. I one sees or the axis 38 points directly at the North Star or Polaris. Then the screw 17 should be tightened to maintain this position. Now, with these alignments being made, the timepiece is ready for telling time both during the day and at night, provided it is clear enough to see the sun and the Big Dipper stars.

To tell the time at night or use the timepiece of this invention as a nocturnal, the dial 30 is set so that the day at which the observation is made is indicated on the date dial 34 at the indicator 29. Next, the eye of the observer is placed in the position E′ as shown in FIG. I and the pointer 40 is rotated about its pivotal axis 38 until the pointer star Alpha in the Big Dipper is aligned with the slot 45. Now the time may be directly read on the inner peripheral time dial 35 from the point on the scale 43, which point corresponds with the observer's longitudinal location in his time zone.

During the day, the time is determined by setting the dial 30 so that either the "0" or 12-hour mark on the time dial 35 is set adjacent the indicator 29. Then the pointer 40 is rotated so that the rays R or R′ from the sun as shown in FIG. II which pass through the aperture 47 are aligned with the line 49 on the post 48. When this occurs, the time of day can be read from the scale 43 on the end of the pointer and the time scale 35 in the same manner as just described, compensating for the longitude of the location of the timepiece. Since the sun raises and lowers at the meridian in the sky from summer to winter, respectively, the location of the dot D of light from the sun's rays R on the line 49 will thus vary throughout the seasons of the year. At the winter solstice the dot D will be at its upper limit on the post 48 or at the cross line WS and at the summer solstice it will be at its lower limit on or at the cross line SS near the base of the post 48. Correspondingly, at the equinoxes in spring and autumn the dot D will be at the center between its upper and lower limits along the post 48, or at the center cross marking on line EQ on line 49. Thus, an indication of the seasons can also be determined by the location of the dot D along the vertical center of the post 48 or along the line 49.

While there is described above the principles of this invention in connection with specific apparatus, it is to be clearly understood that this description is made only by way of example and not as a limitation to the scope of this invention.

I claim:

1. A sun and star time dial comprising:

A) a base supporting an east-west clampable pivot,

B) a first means angularly adjustable in a vertical plane and having aligned apertures at its ends, the axis of which first means is clampable at said pivot so that said apertures align with Polaris, C) a freely rotatable date and hour disc radially mounted on and around said axis at one of said apertures, said disc having an outer peripheral date scale settable to an indicator on said first means and an inner peripheral time scale, and D) a rotatable gnomon pointer means pivotly mounted on and around said one aperture and diametrically of said disc, said pointer means having:

1. a time indicating end cooperating with said inner time scale,
2. a sight at its other end projecting radially outwardly beyond the periphery of said disc for alignment with the other aperture of said first means for sighting a pointer star of the Big Dipper,
3. a gnomon orthogonal of and adjacent to said other end having an aperture whose axis is parallel to the longitudinal axis of said pointer means, and
4. a post intermediate the ends of said pointer means and parallel to said gnomon for alignment with the sun's rays through said aperture in said gnomon in the same plane as the longitudinal axis of said pointer means.

2. A dial according to claim 1 wherein said base comprises a disc and a central axially extending post means.

3. A dial according to claim 1 wherein said clampable pivot comprises a screw and threaded aperture axial of said pivot.

4. A dial according to claim 1 wherein said first means is substantially L-shaped with a protractor along the longer leg of said L.

5. A dial according to claim 4 wherein said L-shaped first means has said indicator at its apex.

6. A dial according to claim 4 wherein said protractor has at least a 90° sector scale.

7. A dial according to claim 1 including a hollow cylindrical sleeve mounted in said one disc supporting aperture for journalling said disc and said pointer means.

8. A dial according to claim 1 wherein said date and hour disc comprises an annular ring with spokes and a hub having the aperture for its pivotal mounting.

9. A dial according to claim 1 including an arcuate scale between the time indicating end of said pointer means and said indicator on said first means for compensating between the difference of longitude time and that of the time zone of the location of said dial.

10. A dial according to claim 9 wherein said arcuate means is mounted on the time indicator end of said pointer means.

11. A dial according to claim 1 wherein said sight on the outer end of said pointer means comprises a slot longitudinal of said pointer means.

12. A dial according to claim 1 wherein said scale post on said pointer means is provided with indicator marks for the seasons of the year.

* * * * *